UNITED STATES PATENT OFFICE.

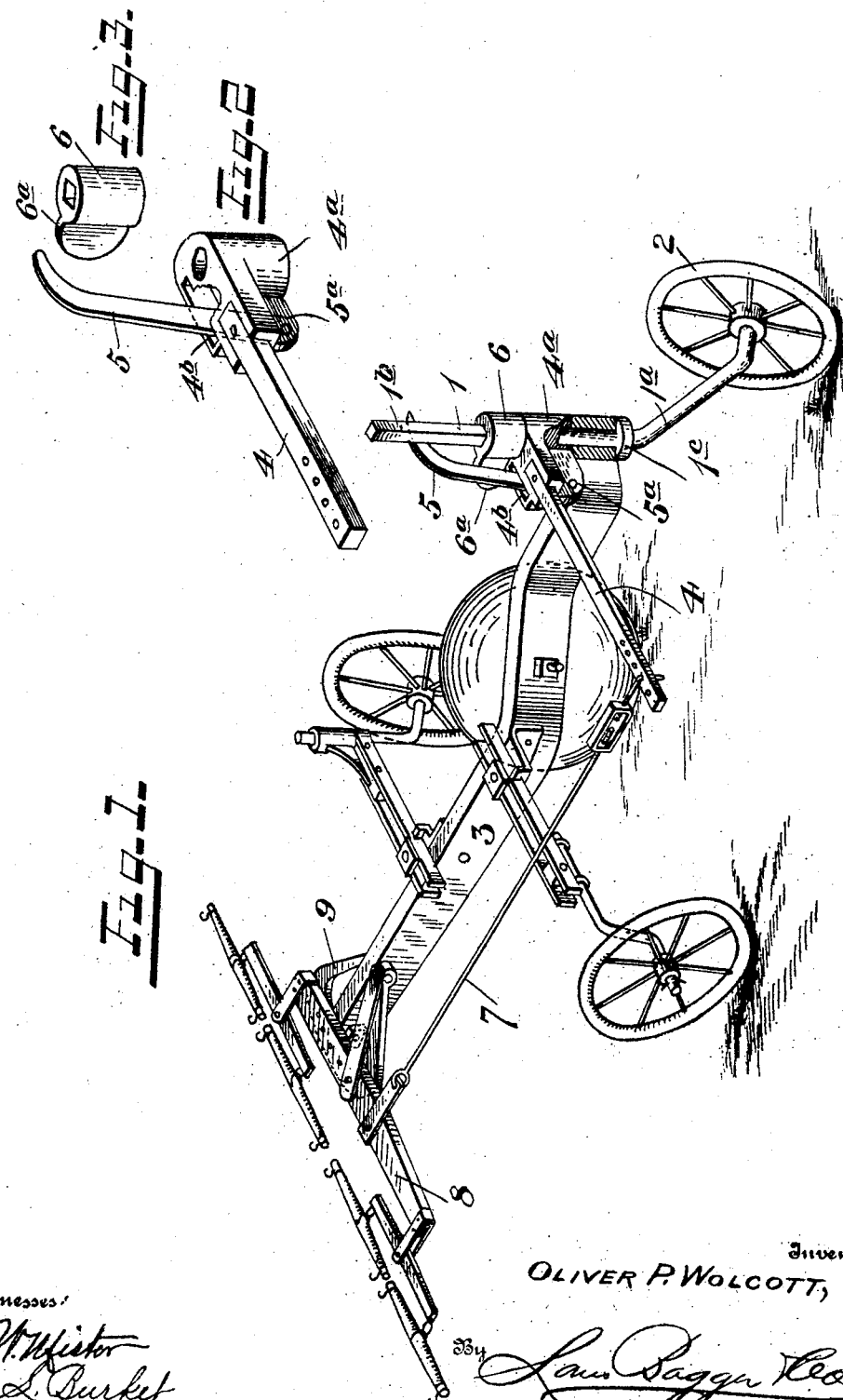

OLIVER P. WOLCOTT, OF DALLAS, TEXAS.

FOUR-HORSE EVENER FOR WHEEL-PLOWS.

No. 796,386.  Specification of Letters Patent.  Patented Aug. 1, 1905.

Application filed April 29, 1904. Serial No. 205,509.

*To all whom it may concern:*

Be it known that I, OLIVER P. WOLCOTT, a citizen of the United States, and a resident of Dallas, in the county of Dallas, State of Texas, have invented certain new and useful Improvements in Four-Horse Eveners to be Used on Wheel-Plows, of which the following is a specification.

My invention relates to improvements in draft-equalizers more particularly designed for plows—disk or moldboard. It has for its object to neutralize or counteract the otherwise skewing or lateral action arising from the tendency of the plow to swing or pivot from the resistance which the plow meets in its contact with the surface or ground and to utilize at the same time this force in connection with the draft-equalizer in relieving the strain or pull upon the team, as in enabling the horse or animal pulling from one arm of said equalizer freedom of movement or from crowding and to travel in the initial or forming furrow of the plowed ground.

Said invention consists of certain detailed structural features substantially as hereinafter more fully disclosed, and specifically pointed out by the claims.

In the accompanying drawings, illustrating the preferred embodiment of my invention, Figure 1 is a perspective view thereof as applied to a disk plow. Fig. 2 is a detached partially-broken-away view of a certain detail or adjunctive part, although not essential to my invention presently explained, the same pertaining to merely a temporary holding contrivance for the retention in effective or working position of the furrow-wheel. Fig. 3 is a detached perspective of one member or part of said holding contrivance.

In the carrying out of my invention I suitably apply or employ in connection with an ordinary disk plow, by way of illustration, what I prefer terming a "cranked" axle 1, bearing or carrying upon its lower end lateral terminal portion $1^a$ a furrow-wheel 2, while its vertical or upright portion $1^b$ passes through an eye-ended terminal of the plow-beam 3, a shoulder $1^c$ being formed upon said upright portion, upon which said beam-terminal rests. Said axle, it is noted, is thus swiveled to suitably turn in said beam as occasion may require in the use of the plow, which, however, constitutes no generic features of my invention, being only incidental thereto.

A lever or arm 4 has one end preferably provided with an eye-ended part or member $4^a$ slipped or inserted upon a cylindric surface of the vertical portion of the axle 1, and through a slot or keeper $4^b$ of said member extends a lever 5, pivoted at its lower end to a preferably edgewise extension $5^a$ of said member. Upon an angular surface $1^b$ of the vertical portion of the axle 1 is inserted a sleeve 6, having an extension or lug $6^a$ adapted to engage the lever 5 for securing said axle, with its wheel, against swiveling. It will be noted, however, that by depressing said lever or moving it toward the arm 4 the former may be disengaged from said lug and said axle, with its wheel, be permitted to have a swiveling action, as required, in turning the plow. Said axle has its wheel-bearing terminal arranged at such an angle to its general plane as to enable the wheel 2 to be presented laterally to and bear upon the wall of the initial or forming furrow, and thus aid primarily to maintain the plow in proper working position as against the tendency to lateral or skewing movement thereof, due to the resistance which the plow meets in its cutting action or contact with the ground, as will be readily understood and as has heretofore generally been accomplished.

Suitable swivel-jointed rod or like connection, as at 7, is adjustably effected between the arm 4 and the draft-equalizer bar or lever 8, itself adapted to be adjustably connected or pivoted to the forward end of the plow-beam 3 by the usual clevis 9 employed for that purpose and to permit the lateral movement or adjustment of said draft-equalizer bar or lever as commonly practiced in positioning the horses of the team, the last noted being equipped with the usual double and single whiffletrees for the connecting up of the team with the plow.

It is noted that the aforesaid lateral or skewing action tendency of the plow from the cause above stated will not only be neutralized or counteracted by the furrow-wheel, but will by the delivery thereof upon the draft-equalizer bar or lever via the connection therebetween and the arm 4, adjunctive of the axle of said furrow-wheel, be utilized or have the effect, as is obvious, to permit the off or unplowed-ground side arm of said bar or lever to be relatively lengthened, consequently the shortening of the plowed-ground-side arm of said bar or lever to be so adjusted as to enable the horse on that side to travel in the initial or forming furrow, whereby said horse may have a firm surface upon which to travel, a desideratum when the fact of the great strain and crowding and pushing action to which such horse has heretofore been subjected in the plowing operation is considered.

It will be understood that latitude is allowed as to details herein, as they may be changed at will as circumstances suggest without departing from the spirit of my invention.

I claim—

1. A device of the character described, comprising a furrow-wheel, its carrying-beam and spindle or axle, a lateral arm having a fixed relation to said spindle, a draft-equalizer bar applied to said beam, at its forward end, and connecting means between said arm and draft-equalizer, with the points of attachment or connection thereof arranged wholly at one and the same side of said furrow-wheel-carrying beam, whereby the resistance offered by the action of said furrow-wheel is utilized to render effective the traveling of the single horse in the bottom of the initial furrow, for the purpose described.

2. A device of the character described, comprising a furrow-wheel, its carrying-beam and spindle or axle, a lateral arm having a fixed relation to said spindle, a draft-equalizer bar applied to said beam, at its forward end, and a connecting-rod between said arm and said equalizer-bar, with the points of attachment or connection thereof arranged wholly at one and the same side of said furrow-wheel-carrying beam, as stated.

3. A device of the character described, comprising a furrow-wheel, its carrying-beam and spindle or axle, a lateral arm, a sleeve upon said spindle effective, in connection with a lever and adjunctive parts, also upon said spindle, for the retention of said arm in fixed relation to said spindle, a draft-equalizer bar applied to said furrow-wheel-carrying beam, and a connecting-rod between said arm and said equalizer-bar, with the points of attachment or connection thereof arranged wholly at one and the same side of said furrow-wheel-carrying beam as specified.

4. A device of the character described, employing, in connection with a furrow-wheel, its axle, and a draft-equalizer bar or lever, a lateral arm loosely sleeved upon said shaft, a second sleeve movable with said axle and having a lateral lug, and a lever adjunctive of said arm and adapted to be engaged by said lug to render effective the connection between said axle and said arm, and means for connecting said arm to said draft-equalizer bar.

5. A device of the character described, employing, in connection with a furrow-wheel, its axle and a draft-equalizer bar, a lateral arm having a loose sleeve inserted upon a cylindric portion of said axle and having a lateral keeper or slot, a lever adjunctive of said arm and arranged within said keeper or slot, a second sleeve fitted upon an angular surface of said axle and having a lateral lug adapted to engage said lever, and render effective the connection between said axle and arm, and means for connecting said arm to said draft-equalizer bar.

In testimony whereof I have set my hand in presence of two subscribing witnesses.

OLIVER P. WOLCOTT.

Witnesses:
J. J. HART,
WM. P. ELLISON.